Nov. 6, 1962  V. J. COATES  3,063,043
RECORDER SCALE EXPANSION SYSTEM
Filed March 4, 1958  5 Sheets-Sheet 3

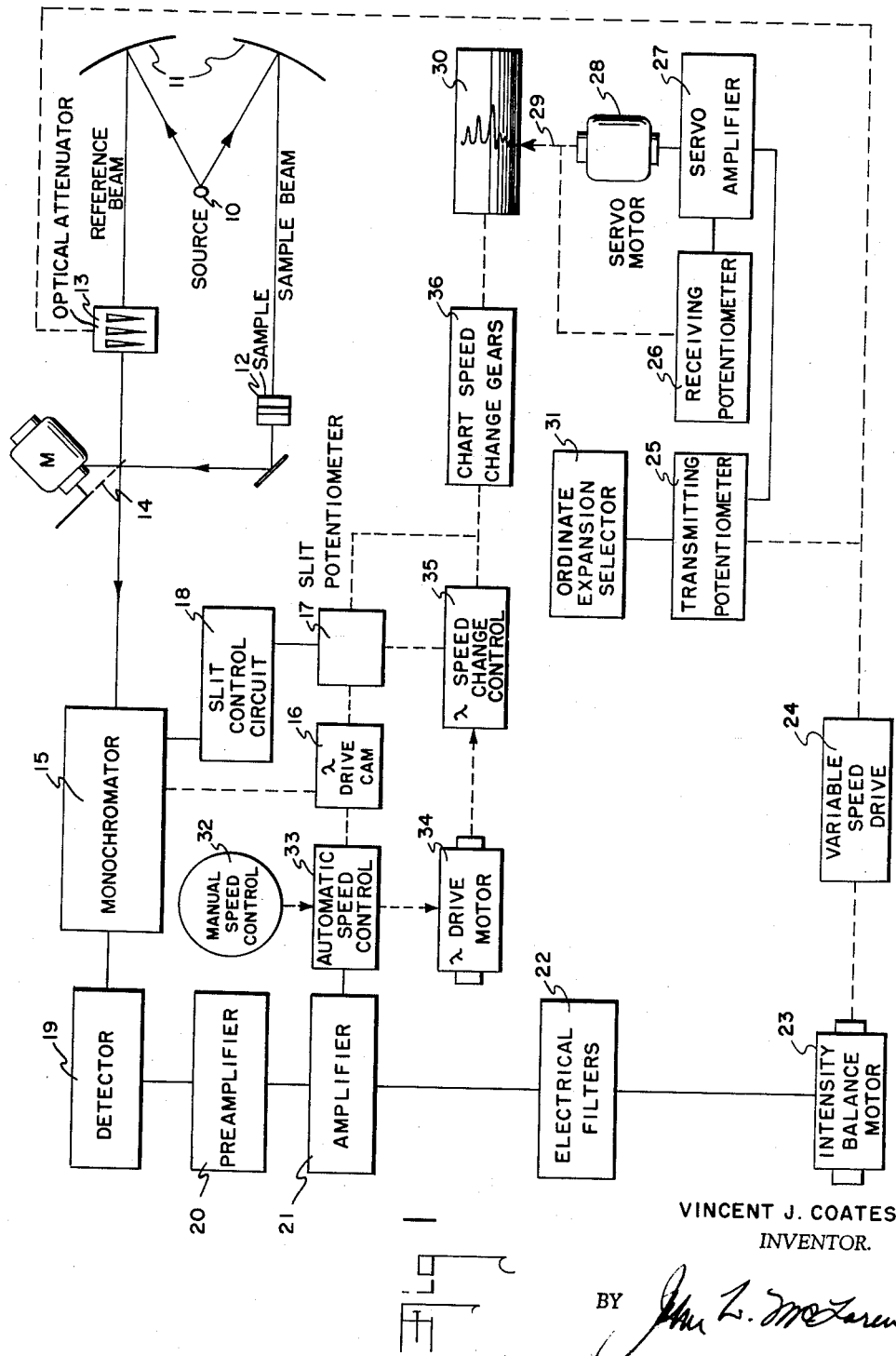

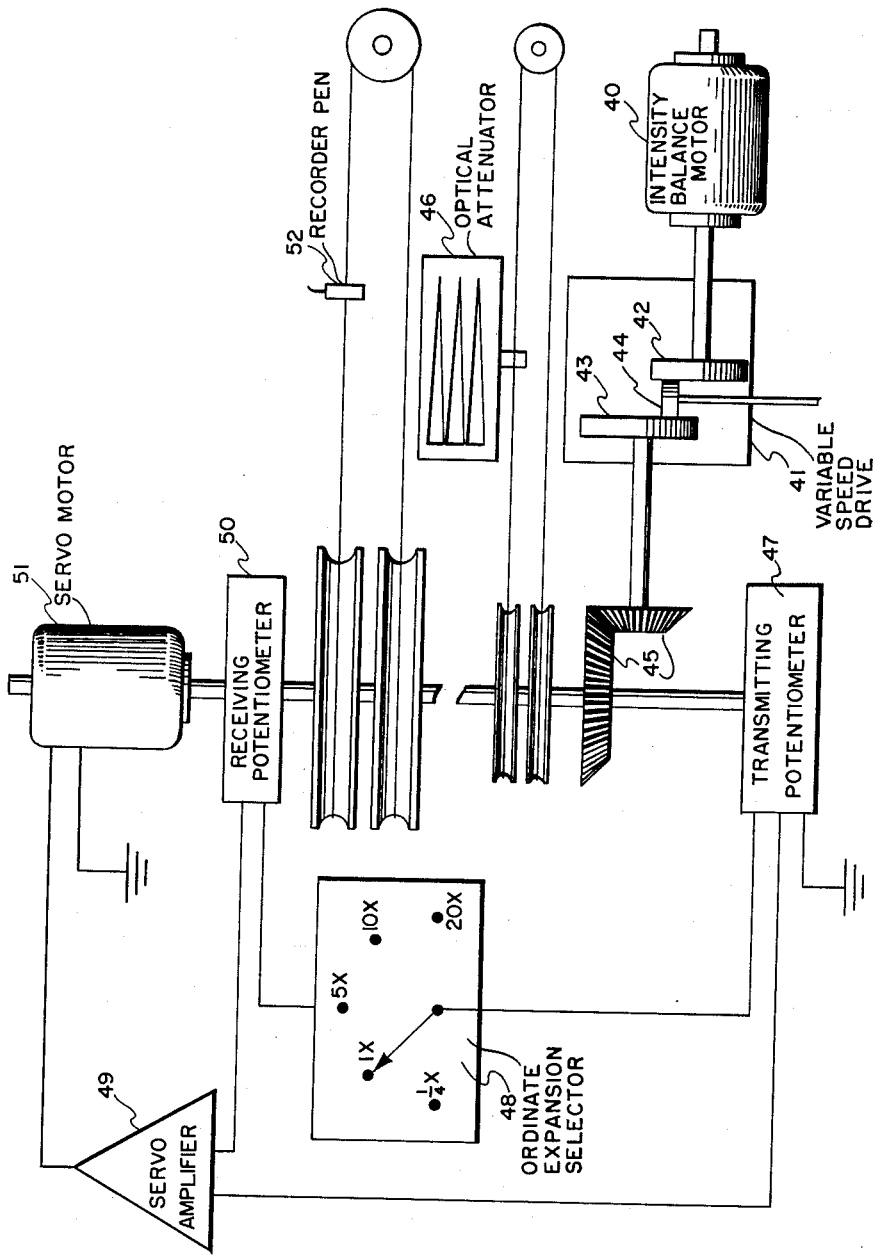

VINCENT J. COATES
*INVENTOR.*

BY

ATTORNEY

Nov. 6, 1962
V. J. COATES
3,063,043
RECORDER SCALE EXPANSION SYSTEM
Filed March 4, 1958
5 Sheets-Sheet 4
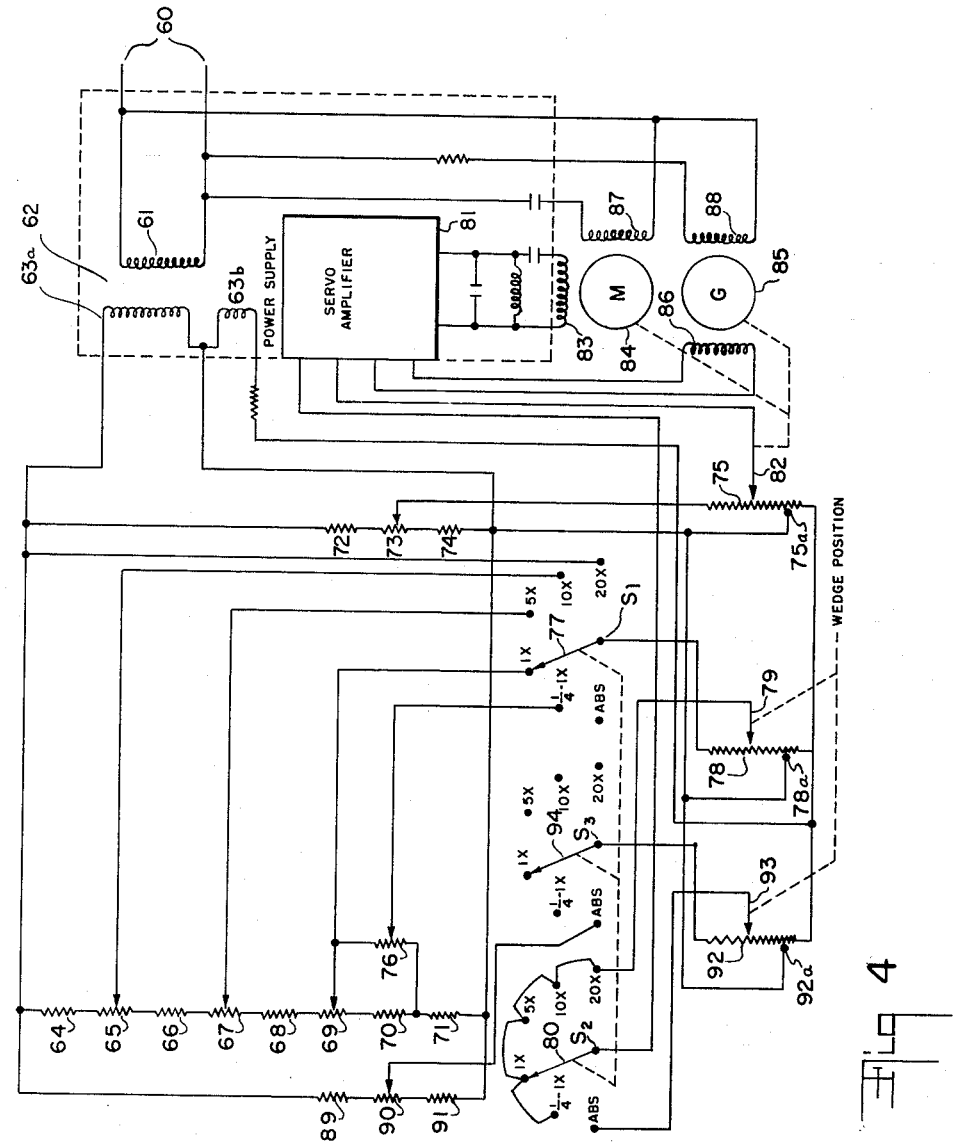
VINCENT J. COATES
*INVENTOR.*
BY
ATTORNEY

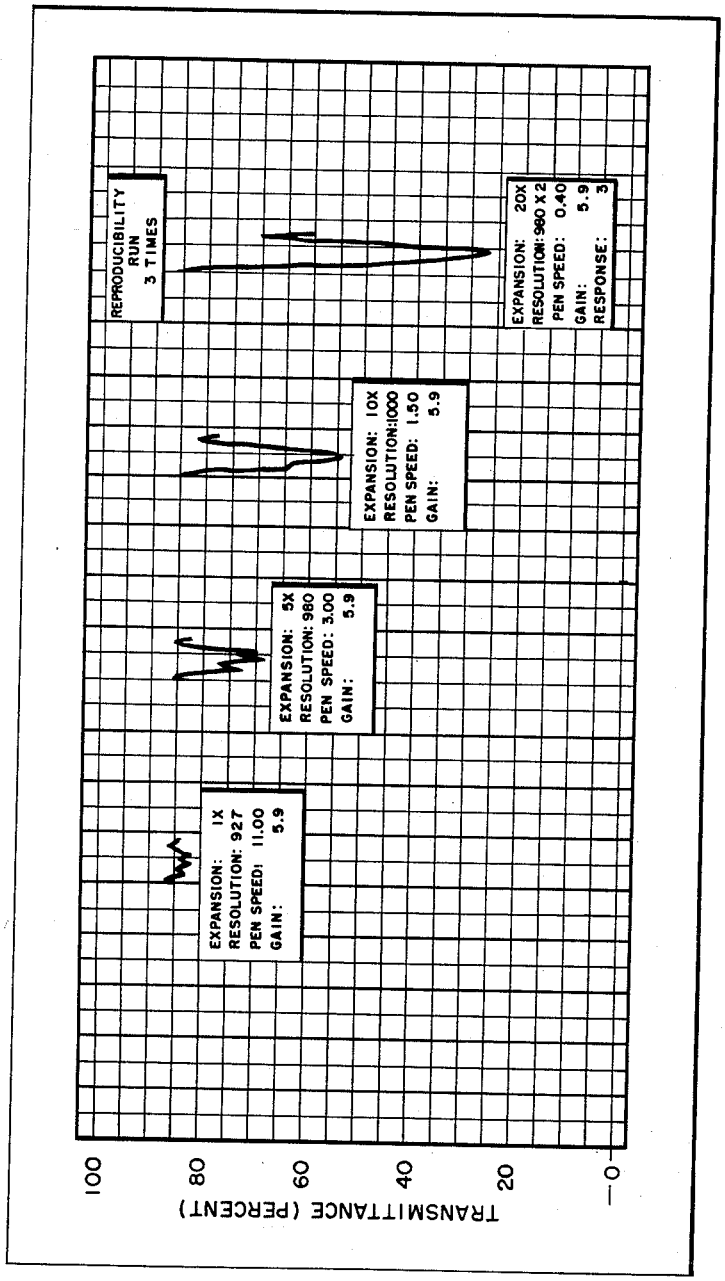

United States Patent Office 3,063,043
Patented Nov. 6, 1962

3,063,043
RECORDER SCALE EXPANSION SYSTEM
Vincent J. Coates, Westport, Conn., assignor to The Perkin-Elmer Corporation, Norwalk, Conn., a corporation of New York
Filed Mar. 4, 1958, Ser. No. 719,165
6 Claims. (Cl. 340—187)

This invention relates to a recording servomechanism system and, more particularly, is concerned with an improved system which affords especial advantages when employed with a null system wherein an element is continuously positioned to maintain a state of balance. The null method of measurement, in which adjustments of apparatus are made until a detector shows no indication of an error signal, possesses the inherent advantage of being more accurate than deflection methods in which instrument calibration errors may be of considerable amplitude. Balanced bridge and potentiometer methods are examples of the null method of measurement.

The present invention is directed to a recording servomechanism loop which is capable of exploiting the inherently greater accuracy of a null system by expanding the recording scale. In a null measurement system, there is included an element, often an attenuator, which is continuously adjusted to maintain a state of balance. Such an attenuator, however, may frequently have a fixed range of operation, for instance, from 0 to 100 percent attenuation. In many scientific measuring instruments, it is not convenient nor wholly feasible to substitute or change attenuators.

As an alternative, the gain of the measurement system may be increased by electrical means, thereby expanding the scale of the recorded data, but the noise and other sources of error signal contained in the detected data will be increased by a commensuate amount inasmuch as the signal-to-noise ratio will remain unchanged. If, however, the effective range of the attenuator is decreased, the gain of the system may be increased by an inversely proportional amount without changing the absolute noise level. Such adjustment affords a signal-to-noise ratio which is improved in the proportion that the gain is increased.

Moreover, those skilled in the art will appreciate that it is relatively simple to expand the scale of data recorded at the two extremities of the recorded scale, i.e., minimum data of the 0 to 10 percent of full scale maximum data in the 90 to 100 percent of full scale, for example. Such data may be expanded by five, ten or even twenty times in order to furnish more detailed information. However, the expansion of data contained in or near the midrange may be limited to the order of two times normal full scale recording for reasons which will be more fully explained hereinafter.

It is the object of the present invention to overcome the deficiencies of such known prior art systems.

The present invention, through its unique combination of coacting elements, makes it possible to quickly and conveniently expand the recording scale of data, improving the signal-to-noise ratio and exploiting the inherently high accuracy of a null system of measurement. In accordance with the teaching of the present invention, any range of selected data may be expanded up to the order of twenty or even fifty times or more. An additional advantage of the concept of the present invention is that it is not bound by the limitations which inhere in some typical prior art systems.

The operation of the present invention, as well as its features and advantages, will be better understood from a description of a typical embodiment and an explanation of its operation.

In the drawings,

FIG. 1 is a block diagram schematic of a spectrophotometer embodying the present invention;

FIG. 2 is a schematic diagram of the recording servomechanism system of the present invention as embodied in the apparatus of FIG. 1;

FIG. 4 is a schematic wiring diagram of the electrical portion of the servomechanism loop of the present invention as embodied in the apparatus of FIG. 1;

FIG. 5 is an illustration of recorded data in several degrees of scale expansion as produced through the use of the present invention.

Figures 3A, 3B:
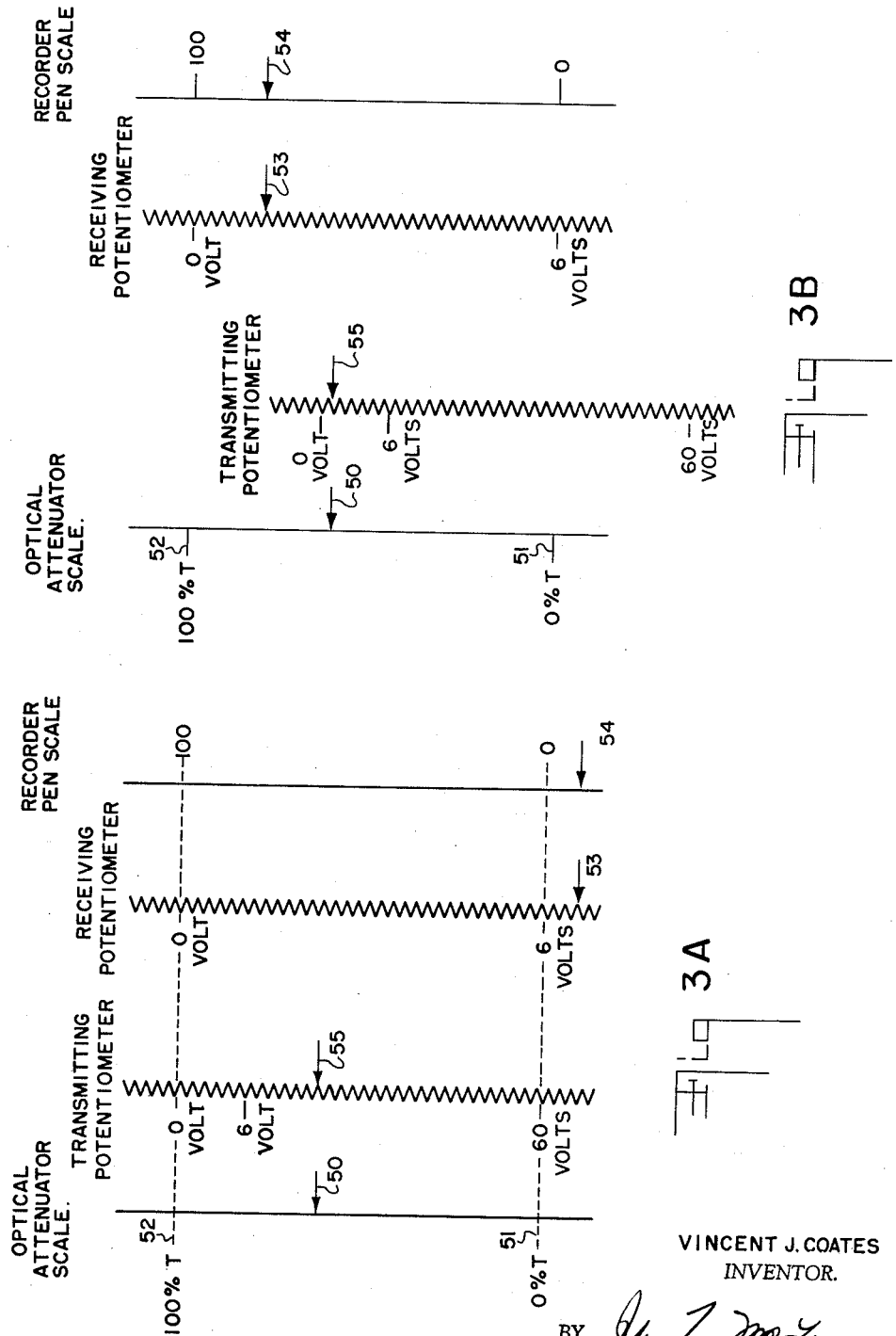
FIGS. 3a and 3b are schematic illustrations of the scale increment selection afforded by the present invention.

The present invention affords desirable advantages in a variety of different applications involving recording servomechanism loops. It will be appreciated that the present invention is not inherently limited in its concept to use in a spectrophotometer recording servomechanism system, but its operation as embodied in a spectrophotometer is typical and therefore will be explained for illustrative purposes. The apparatus comprised in FIG. 1 is a spectrophotometer system of the double beam type which operates on the null principle, i.e., the system is continuously maintained in a state of balance and the usable output signal is derived from the instantaneous adjustment necessary to maintain the balanced condition. In the case of an infrared spectrophotometer, the output signal can be indicative of the transmittance or absorbance of a particular sample throughout a scanned wavelength spectrum. In such a spectrophotometer, a source of infrared radiation 10 is positioned with respect to suitable optical elements 11 to form two beams of radiation, a sample beam and a reference beam. The sample 12 to be analyzed is inserted in the sample beam. An optical attenuator 13 is adapted to be adjustably positioned in the reference beam. In a typical spectrophotometer, the sample absorbs some of the radiation in the sample beam and the optical attenuator 13 is positioned in the reference beam to attenuate a like amount of radiant energy so that the beams are maintained in a state of balance. Thus, the position of attenuator 13 is indicative of the transmittance or absorbance characteristics of the sample 12.

Double-beam spectrophotometer systems are usually designed so that the beams are combined at a common point such as the optical chopper 14. As is well known in the art, the chopper 14 may comprise a semicircular reflective disc which alternately passes equal portions of the sample beam and the reference beam along a common path to the entrance slit of the monochromator 15. Within the monochromator 15, the entrant combined beams are scanned through a wavelength spectrum. A wavelength drive cam 16 is continuously positioned to operatively scan the monochromator 15 through a spectrum. A slit potentiometer 17 is driven in concert with the wavelength cam 16 and feeds its output signal to a slit control circuit 18 which programs the amount of energy allowed to pass through the exit and entrance slits of the monochromator 15. This is done to maintain a constant energy level, the energy emitted by typical sources varying significantly with wavelength.

The scanned spectral bandwidths of the combined beams emerge from the monochromator 15 and fall upon the radiation-sensitive detector 19 which responds to the instantaneous intensity of the radiant energy impinging thereon, converting it to an electrical signal by means such as a thermocouple. A preamplifier 20 couples the relatively weak electrical signal to an amplifier 21 where it is amplified to a suitable level for actuating a servomotor, for instance.

Undesirable components of the amplified signal are suppressed in an electrical filter 22 to eliminate sources of error signal. The filtered signal is fed to a servomotor 23 which is mechanically linked through a variable speed drive 24 to drive the optical attenuator 13. The servomotor 23 positionally adjusts the optical attenuator 13 in a sense and to an extent necessary to maintain intensity balance between the reference and sample beams of the spectrophotometer. The variable tap of a transmitting potentiometer 25 is mechanically positioned in concert with the instantaneous adjustment of the optical attenuator 13.

The tapped outputs of both the transmitting potentiometer 25 and the receiving potentiometer 26 comprise the inputs to the servoamplifier 27. The servoamplifier 27 is adapted to function as a comparison circuit in addition to its amplifying function and produces a signal commensurate with the difference in potential existing between the taps of the transmitting and receiving potentiometers. The amplified difference signal is connected to actuate the servomotor 28 which drives the pen 29 of a recorder 30.

The variable tap of the receiving potentiometer 26 is mechanically linked to be positioned in accordance with the recorder pen position. The servomotor 28 is adapted to be driven in response to the amplified difference signal to match the tapped potential of the receiving potentiometer 26 against the tapped potential 25 of the transmitting potentiometer. The receiving potentiometer tap thus electrically follows the signal derived from the transmitting potentiometer tap.

An ordinate expansion selector 31 provides a number of different potentials which may be selectively impressed across the transmitting potentiometer 25 for different ranges of scale expansion, the potential impressed across the receiving potentiometer 26 being maintained constant.

The particular spectrophotometer illustrated in FIG. 1 is also provided with a manual speed control 32 by which the instrument may be operated manually, if desired. Alternatively, an automatic speed control 33 may be employed to scan through wavelength spectra automatically. A wavelength drive motor 34 responds to the automatic speed control and, through suitable mechanical linkage such as change gears 36, the chart speed of the recorder 30 may be selectively varied.

FIG. 2 illustrates the recording servomechanism system included in the spectrophotometer schematically illustrated in FIG. 1. The intensity balance motor 40 receives a signal commensurate with the difference in intensity between the two beams of radiant energy employed in the spectrophotometer and actuates a variable speed drive 41. The variable speed drive 41 may comprise a first disc 42 arranged to be driven by the shaft of the balance motor 40 and a second disc 43 disposed to be rotatably driven about an axis parallel to that of the intensity balance motor shaft. A third disc 44 mechanically links the two other discs and provides friction drive therebetween. The central friction drive disc 44 is arranged to be selectively positioned whereby to change the drive ratio between the drive disc 42 and the driven disc 43. The driven disc 43 is mechanically linked through gears 45 or other appropriate mechanical linkage to position the optical wedge 46. Thus, by utilizing the variable speed drive to change the drive ratio between the intensity balance motor 40 and the optical wedge 46, the recorder system can always be operated at its most favorable signal-to-noise ratio.

The variable tap of a transmitting potentiometer 47 is driven in concert with the optical wedge so that its position is a function of the attenuation of the reference beam of the spectrophotometer to maintain a state of balance between the two beams. A potential derived from an ordinate expansion selector 48 is impressed upon the transmitting potentiometer 47. The potentials available through selection by the ordinate expansion selector 48 are usually integral multiples such as normal scale, 5× normal scale, 10× normal scale, 20× normal scale, etc. Within the electrical ordinate expansion selector 48 there may also be provided potentials of lesser amplitude than that which affords normal scale reading, thus affording means for scale compression as, for instance, ¼–1× normal scale reading.

The tapped output of the transmitting potentiometer is connected to a servoamplifier 49. A receiving potentiometer 50 having a fixed potential impressed across its terminals also feeds the potential developed at its variable tap to the servoamplifier 49. The servoamplifier 49 produces an output signal commensurate with the instantaneous difference existing between the potentials tapped from the transmitting potentiometer 25 and the receiving potentiometer 26. The amplified difference signal actuates a servomotor 51 which continuously drives the variable tap of the receiving potentiometer 50 to a position to maintain the tapped potentials of the potentiometers 47 and 50 at the same value. The servomotor 51 also drives the recording means 52 and thus records a graphical representation of the instantaneous position of the optical attenuator 46.

As indicated in FIG. 2, the ordinate expansion selector 48 may be selectively positioned to impress upon the transmitting potentiometer 47 a potential equal to or 5×, 10×, or 20× the fixed potential across the receiving potentiometer 50. By increasing the transmitting potentiometer potential tenfold, for instance, a given rotation of the variable tap of the transmitting potentiometer will change the tapped potential by ten times as much as would be the case if the potentials across the transmitting and receiving potentiometers were the same. Thus, the difference between the potentials tapped from the two potentiometers 47 and 50 is ten times the value it would be at 1× or normal scale setting and, in order to null the difference, the variable tap of the receiving potentiometer must be driven through ten times the displacement that would be necessary in the 1× scale mode of operation. Under such conditions, however, noise and other errors in the recording system would also be amplified tenfold.

The concept of the present invention contemplates changing the drive ratio between the intensity balance motor 40 and the driven elements, the optical attenuator 46, and the variable tap of the transmitting potentiometer 47. Through the use of the variable speed drive 41, the optimum operational conditions within the nulling servomechanism loop of the spectrophotometer system may be maintained to minimize noise and other unwanted sources of error so that the recorded intelligence is improved ten times in the sense that the noise is maintained at substantially the same absolute value while the desired signal has been expanded tenfold.

In accordance with the teaching of the present invention, the transmitting potentiometer 47 is arranged so that its body may be positioned relative to, but independent of, its variable tap. Such adjustment effectively repositions the reference point of the recorded signal, making it possible to avail fully of a significantly expanded scale even when the desired information falls within the 40 to 60 percent range, for instance, of the normal scale recording. Those skilled in the art will appreciate that electrical scale expansion is readily accomplished when the signal to be expanded lies at either extremity of the normal scale recording. That is to say that, if the signal which it is desired to expand lies within the 80 to 100 percent range or the 0 to 20 percent range, for instance, of a normal scale recording, electrical scale expansion will readily avail of the order of 5× normal scale expansion without further adjustment and without the loss of recorded information by reason of running off scale. Similarly, signals within the 90 to 100 percent range or the 0 to 10 percent range may be readily expanded to the order of tenfold or more without further adjustment of the recorder. If, however, the recorded information which it is desired to expand falls within the 40 to 60 percent range of normal scale recording, the maximum expansion which can be achieved without running off scale may be 2× normal scale recording or perhaps less.

The feature of the present invention which affords reorientation of the reference base for recorded information makes it possible to quickly and simply shift the recorded information to be expanded so that the full advantages of maximum scale expansion can be realized. This is accomplished readily, quickly and reliably by electrical means, i.e., by selectively positioning the transmitting potentiometer 47 with respect to its variable tap. Additionally, it should be appreciated that the degree of accuracy and reliability of scale expansion, i.e., 5×, 10×, 20× or more, is in no way affected by adjusting the position of the transmitting potentiometer 47 with respect to its variable tap in order to reorient the reference point of the recorded information.

FIGS. 3a and 3b schematically illustrate the operation of the potentiometers used in the present invention to electrically transmit a signal commensurate with the instantaneous position of an element in a null measurement system which is continuously driven to maintain a state of balance. In the particular spectrophotometer embodiment previously described, the transmitting and receiving potentiometers of the recording servo-mechanism system of the present invention convert the positions of an optical attenuator and a recorder pen, respectively, into electrical potentials. It will be recalled that the variable tap of the transmitting potentiometer is driven by a variable speed drive and mechanically linked to the optical attenuator. The variable tap of the receiving potentiometer is driven by the recorder pen motor and is mechanically linked to the recorder pen. Thus, the potentials developed at the variable taps of the two potentiometers correspond to the optical attenuator and recorder pen positions, respectively.

At a normal or one-to-one scale expansion, the potential impressed upon the transmitting potentiometer is the same as that impressed upon the receiving potentiometer. Under these conditions, the variable tap of the receiving potentiometer moves through the same angular displacement as the variable tap of the transmitting potentiometer since the potentials across the potentiometers are the same. Thus, it may be appreciated that the recorder pen moves the same number of units on the recorder scale that the optical attenuator moves with respect to its full scale. Accordingly, movement of the recorder pen per scale unit of optical attenuator motion depends upon the magnitude of the potential impressed across the transmitting potentiometer relative to that across the receiving potentiometer.

When the scale is expanded by increasing the potential impressed on the transmitting potentiometer, the range of movement of the optical attenuator which corresponds to full scale deflection of the recorder pen will be decreased. If, for instance, the scale is expanded ten times, maximum recorder pen deflection will correspond to movement of the optical attenuator through one tenth of its full range. Operation outside this short range will cause the recorder pen to run off scale. Provision must therefore be made to insure that the pen records all significant data on scale. This is accomplished by selectively displacing the operative portion of the resistance of the transmitting potentiometer with respect to its variable tap as schematically illustrated in FIGS. 3a and 3b.

Assuming for purposes of illustration that, as shown in FIG. 3a. the transmitting potentiometer has 60 volts impressed across it whereas the receiving potentiometer has 6 volts impressed upon it, there will result a ten-to-one scale expansion. If the optical attenuator or other continuously positioned member of a null measurement system is operating at about midrange between its limit stops 51 and 52, the receiving potentiometer variable tap 53 will run off scale as will the recorder pen 54. This is caused by the fact that the variable tap 55 of the transmitting potentiometer is positioned in accordance with the position of the optical attenuator. Under the conditions illustrated, the variable tap 55 of the transmitting potentiometer is positioned at about midrange and, according to the scale used in FIG. 3a, the variable tap 55 of the transmitting potentiometer will therefore tap a potential of approximately the order of 12 volts. It will be recalled that the variable tap of the receiving potentiometer is actuated by the difference signal existing between the variable taps of the transmitting and receiving potentiometers so as to null that difference potential. The variable tap 53 of the receiving potentiometer is therefore actuated to tap 12 volts from the receiving potentiometer. However, since the full scale of the receiving potentiometer is of the order of 6 volts, the variable tap 53 merely runs off scale and, as a consequence, valuable data may be lost.

In accordance with the teaching of the present invention, however, the recorded data may be repositioned so as to be included within the operationally effective recording range. As illustrated in FIG. 3b, the resistance of the transmitting potentiometer has been displaced with respect to its variable tap 55 so that the variable tap 55 is within the 0 to 6 volt range of operation. As will be readily appreciated by those skilled in the art, the scale expansion ratio remains the same. However, variable tap 53 of the receiving potentiometer is now capable of balancing out a potential difference existing between the variable tap 53 and the variable tap 55 of the transmitting potentiometer without running off scale. Thus, all the informational data will be recorded accurately so long as the position of the optical attenuator does not vary outside approximately a 10 percent range of operation substantially about its midpoint of full range operation. If the maximum variation is substantially larger than 10 percent of normal full range, the scale expansion can be lessened to insure that all information is recorded.

FIG. 4 is a schematic illustration of the electrical portion of the system of an embodiment of the present invention. An electrical power source is connected to the terminals 60 across the primary winding 61 of transformer 62, developing a potential across the secondary windings 63a and 63b of the transformer. The secondary voltage developed across winding 63a is impressed across serially connected resistors 64, 65, 66, 67, 68, 69, 70 and 71. In parallel with resistors 64 through 71 are resistors 72, 73, and 74. 73 is a resistor having a variable tap and the selectively tapped potential is impressed across the receiving potentiometer 75. In usual operation, once having been initially adjusted, the variable tap of resistor 73 remains unchange so that a fixed potential appears across the receiving potentiometer 75 during operation of the system.

Resistors 65, 67, 69 have variable taps which are connected to the 10×, 5×, 1× contacts, respectively, of the first bank S1 of a selector switch as illustrated. The variable taps of resistors 65, 67, and 69 afford a means of accurately adjusting the tapped voltages so that they are respectively 10×, 5×, and 1× the fixed voltage developed across the receiving potentiometer 75. The 20× contact of selector switch S1 is connected across the full voltage developed by the secondary winding 63a.

The voltage developed across resistors 70 and 71 is less than the voltage impressed upon the receiving potentiometer 75 and, by means of a variable tap resistor 76, the tapped voltage may be adjusted to a value of one quarter of the fixed voltage appearing across the receiving potentiometer 75. This latter voltage appears at ¼–1× contact of the first bank S1 of the selector switch. The contact arm 77 of the first bank S1 of the selector switch is connected to the transmitting potentiometer 78 so that the potential appearing across the transmitting potentiometer 78 is determined by the position of the selector switch.

A second bank S2 of the selector switch, simultaneously operative with the first bank S1 of the switch, has its contacts (designated as ¼–1×, 1×, 5×, 10× 20×) serially connected with variable tap 79 of the transmitting potentiometer 78. The contact arm 80 of the second bank S2 of the selector switch is connected to feed the potential tapped from the transmitting potentiometer to the servoamplifier 81. In a similar manner, the variable tap 82 of the receiving potentiometer 75 is connected with the servoamplifier 81.

As previously described, the servoamplifier 81 performs the function of comparing the two tapped input signals and producing an amplified output commensurate with the sense and amplitude of the potential difference between its two input signals. The servoamplifier output signal is impressed upon winding 83 of a servomotor 84 which is in turn mechanically connected through appropriate linkage to position the variable tap 82 of the receiving potentiometer 75. The servomotor 84 also drives a generator 85 which develops a signal in winding 86 providing rate feedback to the servoamplifier 81. The fixed windings 87, 88 of the servomotor 84 and the generator 85, respectively, are both energized from the same source as the primary winding 61 of the transformer 62.

The particular electrical system illustrated in FIG. 4, when used in a spectrophotometer, also affords a means of recording absorbance as well as transmittance. Since the absorbance is equal to the $$\log_{10} \frac{1}{T}$$

where $T$=transmittance, absorbance can be directly recorded if the optical attenuator or wedge positions the variable tap of a transmitting potentiometer having an output which is a logarithmic function of its analog input. The logarithmic characteristic of potentiometer 92 is symbolically illustrated as a compressed resistance at one extremity. The tap 93 of the log potentiometer 92 is positioned in concert with the variable tap 79 of the linear transmitting potentiometer 78 through appropriate mechanical linkage and, when the selector switch is positioned at the absorbance (ABS) contact, the tapped output of the linear potentiometer 78 is disconnected from the input circuit of the servoamplifier 81 and the tapped output of the log potentiometer 92 is connected to the servoamplifier 81 in its place. Accordingly, the recorded data is the $\log_{10}$ of the reciprocal of transmittance, or absorbance. Through its contact arm 94, the third bank S3 of the selector switch affords a means for connecting an initially adjustable but operationally fixed potential across the log potentiometer 92 when the selector switch is positioned for the absorbance recording mode of operation. Resistors 89, 90, and 91 are serially connected across the secondary winding 63a of transformer 62 and one of the resistors 90 has an adjustable tap which is connected to the contact arm 88 of the third bank S3 of the selector switch.

In order to provide a "live" full scale or 100 percent recorder operation, the linear transmitting potentiometer 78, the logarithmic function transmitting potentiometer 92, and the receiving potentiometer 75 are all tapped near one end of their resistances as illustrated in FIG. 4. The taps 92a, 78a and 75a provide common points which can be made to correspond to full scale on the recorder. The tapped ends of the resistances 75, 78, and 92 are connected across a low voltage secondary winding 63b of the transformer 62. The winding 63b develops a small signal opposite in sense to the signal which drives the recorder pen above full scale and therefore returns the recorder pen down scale when it overshoots. Since the potentials developed at the taps 78a and 92a of both the transmitting potentiometers 78 and 92, as well as that developed at the tap 75a of the receiving potentiometer 75 are the same, there is no scale expansion of the recorder pen displacement above full scale regardless of the setting of the scale expansion selector switch.

FIG. 5 illustrates several recorded results of typical operation of the present invention used in conjunction with a spectrophotometer system. The graphical illustration represents percent transmittance of a particular sample through a narrow spectral band width of wavelength shown along the abscissa. These particular recordings were made on a Perkin-Elmer Model 21 spectrophotometer embodying the present invention with the resolution, pen speed, and gain adjustments set as follows: the first illustration shows a normal full range 1× expansion using a resolution of 927, a pen speed of 11.00, and a gain of 5.9; the second graph shows the same spectral band width recorded at a 5× expansion using a resolution of 980, a pen speed of 3.00, and a gain of 5.9; the third graph illustrates the identical spectral band width expanded 10× using a resolution of 1000, a pen speed of 1.50 and a gain of 5.9. The fourth graph shows an expansion of 20× using a resolution of 980×2, a pen speed of 0.40, and a gain of 5.9.

The recording servomechanism system of the present invention therefore provides the means of enhancing and exploiting the fullest inherent capabilities of performance in a null-type measuring system. The unique combination of coacting elements in the present invention, when employed with such a null-type measuring system, provide hitherto unrealized performance capabilities of radiant energy analysis instrumentation, such as infrared spectrophotometers, particularly in trace analysis and similarly difficult problems.

The concept of the present invention contemplates the use of equivalent electrical transmitting and receiving means such as tapped autotransformers, for instance, in lieu of the variable tap resistors and potentiometers utilized in the particular embodiments disclosed herein. It will also be apparent that within the scope of the present invention equivalent positional translation means, such as synchros, may be employed and different types of variable speed drives other than friction driven discs may be included in aparatus within the scope and teaching of the present invention.

Since many changes could be made in the specific combinations of apparatus disclosed herein and many apparently different embodiments of this invention could be made without departing from the scope thereof, it is intended that all matter contained in the foreging description or shown in the accompanying drawings shall be interpreted as being illustrative and not in a limiting sense.

I claim:

1. In combination with a null measurement system which includes a balancing element continuously positioned by drive means to maintain a state of balance, means interconnecting said balancing element and its drive means for selectively adjusting the drive ratio therebetween a recording servomechanism loop comprising an indicator operatively responsive to the position of said balancing element, transmitting and receiving potentiometers connected in a bridge circuit, the wiper of said transmitting potentiometer being coupled to said balancing element, an electrical source connected to said bridge circuit for developing a potential across said receiving potentiometer and including means for selectively impressing any of a plurality of different electrical potentials across the transmitting potentiometer of said bridge, means responsive to the signal between the wipers of said transmitting and receiving potentiometers for positioning the wiper of said receiving potentiometer to reduce said signal to a null, and means for selectively changing the position of the body of said transmitting potentiometer relative to its wiper.

2. In combination with a null measurement system which includes a balancing element continuously positioned by drive means to maintain a state of balance, means interconnecting said balancing element and its drive means for selectively adjusting the drive ratio therebetween, a recording servomechanism loop comprising an indicator operatively responsive to the position of said balancing element, transmitting and receiving potentiometers connected in a bridge circuit, the wiper of said transmitting potentiometer being coupled to said balancing element, a source of electrical potential connected to said potentiometers for developing potentials thereacross, means for changing the ratio of the potential developed across said transmitting potentiometer relative to that developed across said receiving potentiometer, means responsive to the signal between the wipers of said transmitting and receiving potentiometers for positioning the wiper of said receiving potentiometer to reduce said signal to a null, and means for selectively changing the position of the body of said transmitting potentiometer relative to its wiper.

3. In combination with a null system which includes a balancing element continuously positioned by drive means to maintain a state of balance, means interconnecting said balancing element and its drive means for selectively adjusting the drive ratio therebetween said driven element and its drive means, a recording servomechanism loop comprising an indicator operatively responsive to the position of said balancing element, transmitting and receiving potentiometers connected in a bridge circuit, the wiper of said transmitting potentiometer being coupled to said balancing element, a first source of electrical potential connected to said potentiometers for developing potentials thereacross, a resistive element connected in series with each potentiometer and in parallel with a second source of electrical potential, means for changing the ratio of the potential developed across said transmitting potentiometer relative to that developed across said receiving potentiometer, means responsive to the signal between the wipers of said transmitting and receiving potentiometers for positioning the wiper of said receiving potentiometer to reduce said signal to a null, and means for selectively changing the position of the body of said transmitting potentiometer relative to its wiper.

4. In combination with a null system which includes a balancing element continuously positioned by drive means to maintain a state of balance, means interconnecting said balancing element and its drive means for selectively adjusting the drive ratio therebetween, a recording servomechanism loop comprising an indicator operatively responsive to the position of said balancing element, transmitting and receiving potentiometers connected in a bridge circuit, the wiper of said transmitting potentiometer being coupled to said balancing element, means for developing a fixed potential across said receiving potentiometer, means for energizing said transmitting potentiometer with any selected one of a plurality of additional potentials, means responsive to the signal between the wipers of said transmitting and receiving potentiometers for positioning the wiper of said receiving potentiometer to reduce said signal to a null, and means for selectively changing the position of the body of said transmitting potentiometer relative to its wiper.

5. In combination with a null system which includes a balancing element continuously positioned by drive means to maintain a state of balance, means interconnecting said balancing element and its drive means for selectively adjusting the drive ratio therebetween, a recording servomechanism loop comprising an indicator operatively responsive to the position of said balancing element, transmitting and receiving potentiometers connected in a bridge circuit, the wiper of said transmitting potentiometer being coupled to said balancing element, means for developing a fixed potential across said receiving potentiometer, means for developing a plurality of potentials, said potentials being different multiples of said fixed potential, means for selectively impressing any of said multiple potentials across said transmitting potentiometer, means responsive to the signal between the wipers of said transmitting and receiving potentiometer to reduce said signal to a null, and means for selectively changing the position of the body of said transmitting potentiometer relative to its wiper.

6. In combination with a null system which includes a balancing element continuously positioned by drive means to maintain a state of balance, means interconnecting said balancing element and its drive means for selectively adjusting the drive ratio therebetween, a recording servomechanism loop comprising an indicator operatively responsive to the position of said balancing element, transmitting and receiving potentiomters connected in a bridge circuit, the wiper of said transmitting potentiometer being coupled to said balancing element, an electrical source of first and second potentials, means for developing a fixed portion of said first potential across said receiving potentiometer, means for selectively impressing any of a plurality of different portions of said first potential across said transmitting potentiometer, a resistive element connected in series with each said potentiometer and in parallel with said second potental, means responsive to the signal between the wipers of said transmitting and receiving potentiometers for positioning the wiper of said receiving potentiometer to reduce said signal to a null, and means for selectively changing the position of the body of said transmitting potentiometer relative to its wiper.

References Cited in the file of this patent

UNITED STATES PATENTS

| | | |
|---|---|---|
| 2,221,170 | Richardson | Nov. 12, 1940 |
| 2,302,049 | Parker et al. | May 17, 1942 |
| 2,355,537 | Jones | Aug. 8, 1944 |
| 2,577,735 | Broomell | Dec. 11, 1951 |
| 2,584,954 | Williams | Feb. 5, 1952 |
| 2,614,327 | Russell | Oct. 21, 1952 |
| 2,775,160 | Foskett et al. | Dec. 25, 1956 |
| 2,787,512 | Pierstorff | Apr. 2, 1957 |
| 2,790,945 | Chope | Apr. 30, 1957 |
| 2,912,163 | Tuyl | Nov. 10, 1959 |